(12) United States Patent
Wang et al.

(10) Patent No.: US 7,366,550 B2
(45) Date of Patent: Apr. 29, 2008

(54) HANDHELD ELECTRONIC APPARATUS

(75) Inventors: Chien-Jui Wang, Taipei (TW);
Chun-Hsiung Yin, Yungkang (TW);
Michael M. Shen, Taipei (TW)

(73) Assignee: Benq Corporation, Taoyuan (TW)

( * ) Notice: Subject to any disclaimer, the term of this patent is extended or adjusted under 35 U.S.C. 154(b) by 633 days.

(21) Appl. No.: 10/753,512

(22) Filed: Jan. 8, 2004

(65) Prior Publication Data
US 2005/0070328 A1 Mar. 31, 2005

(30) Foreign Application Priority Data
Sep. 29, 2003 (TW) .............................. 92126816 A

(51) Int. Cl.
*H04M 1/00* (2006.01)
(52) U.S. Cl. ............... 455/575.1; 455/90.3; 455/575.3; 455/556.1; 370/454; 370/433.13
(58) Field of Classification Search ............. 455/575.1, 455/575.3, 90.3, 556.1; 379/454, 433.13
See application file for complete search history.

(56) References Cited
U.S. PATENT DOCUMENTS

| | | | |
|---|---|---|---|
| 6,549,789 B1 * | 4/2003 | Kfoury | 455/550.1 |
| 6,774,888 B1 * | 8/2004 | Genduso | 345/168 |
| 6,834,199 B2 * | 12/2004 | Hyun et al. | 455/575.1 |
| 7,031,143 B2 * | 4/2006 | Madsen et al. | 361/680 |
| 2003/0040288 A1 * | 2/2003 | Kang et al. | 455/90 |
| 2003/0124991 A1 * | 7/2003 | Kiuchi et al. | 455/90 |
| 2003/0228847 A1 * | 12/2003 | Matsumoto | 455/90.3 |
| 2006/0005356 A1 * | 1/2006 | Amano et al. | 16/341 |

FOREIGN PATENT DOCUMENTS

| | | |
|---|---|---|
| TW | 487279 | 5/1991 |
| TW | 520809 | 2/1992 |
| TW | 537556 | 3/1992 |

* cited by examiner

*Primary Examiner*—Matthew Anderson
*Assistant Examiner*—Dominic E. Rego
(74) *Attorney, Agent, or Firm*—Thomas, Kayden, Horstemeyer & Risley

(57) ABSTRACT

A handheld electronic apparatus. The handheld electronic apparatus includes a first connecting member, a second connecting member, an operating member, a first holding member and a second holding member. The second connecting member is rotatably connected to the first connecting member. The operating member is rotatably connected to the second connecting member. The first holding member is rotatably connected to the first connecting member. The second holding member is rotatably connected to the first connecting member. The first and second holding members relatively rotate between a closed position and an open position. The invention thereby provides convenient use of communication, digital photography, PDA, and video game functions in a single device.

26 Claims, 12 Drawing Sheets

HANDHELD ELECTRONIC APPARATUS

BACKGROUND OF THE INVENTION

1. Field of the Invention

The present invention relates to a handheld electronic apparatus, and in particular to a handheld electronic apparatus that combines communication, digital photography, PDA, and video game functions.

2. Description of the Related Art

Conventional cellular phones often combine communication, digital photography, and video game functions, or communication, PDA, and video game functions. None, however, combines all. Furthermore, because the aforementioned functions are often poorly deployed in conventional cellular phones, it is often inconvenient to utilize one or more thereof.

SUMMARY OF THE INVENTION

Accordingly, an object of the invention is to provide a handheld electronic apparatus providing communication, digital photography, PDA, and video game functions, fully utilizing the space thereof such that multiple functions are more efficiently provided. The present handheld electronic apparatus also provides reduced weight and ergonomic shape, such that more comfortable use thereof is enabled. The handheld electronic apparatus comprises a first connecting member, a second connecting member, an operating member, a first holding member and a second holding member. The second connecting member is rotatably connected to the first connecting member. The operating member is rotatably connected to the second connecting member. The first holding member is rotatably connected to the first connecting member. The second holding member is rotatably connected to the first connecting member. The first and second holding members relatively rotate between a closed position and an open position.

The handheld electronic apparatus further comprises a first rotating shaft disposed between the first and second connecting members. The first and second holding members relatively rotate by means of the first rotating shaft.

The second connecting member further comprises a recess and the operating member further comprises a pin rotatably disposed therein. The second connecting member and operating member relatively rotate by means of the pin and recess.

The first rotating shaft is perpendicular to the pin.

The handheld electronic apparatus further comprises a second rotating shaft and a third rotating shaft, both disposed in the first connecting member. The first holding member is rotatably mounted on the second rotating shaft, and the second holding member is rotatably mounted on the third rotating shaft.

The first holding member further comprises a first toothed portion and the second holding member further comprises a second toothed portion engaging the first toothed portion.

The first connecting member further comprises an image capturing module having a camera lens disposed thereon.

The operating member further comprises a cellular phone module and a computer module, respectively disposed on opposite surfaces thereof. The cellular phone module further comprises a keypad, a display and a speaker. The computer module further comprises an LCD touch panel.

The operating member further comprises a circuit module and the first holding member further comprises a power cell receiving portion to receive a cell providing power to the circuit module.

The first holding member further comprises a first operating interface having a first operating button.

The second holding member further comprises a second operating interface having a second operating button.

The handheld electronic apparatus further comprises a wireless transmission module disposed in the operating member, first holding member, or second holding member.

The handheld electronic apparatus further comprises a first signal transmission cable connected to the first holding member and operating member. The first signal transmission cable connects the operating member and first holding member via the first and second connecting members.

The handheld electronic apparatus further comprises a second signal transmission cable connecting the second holding member and operating member. The second signal transmission cable connects the operating member and second holding member via the first and second connecting members.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
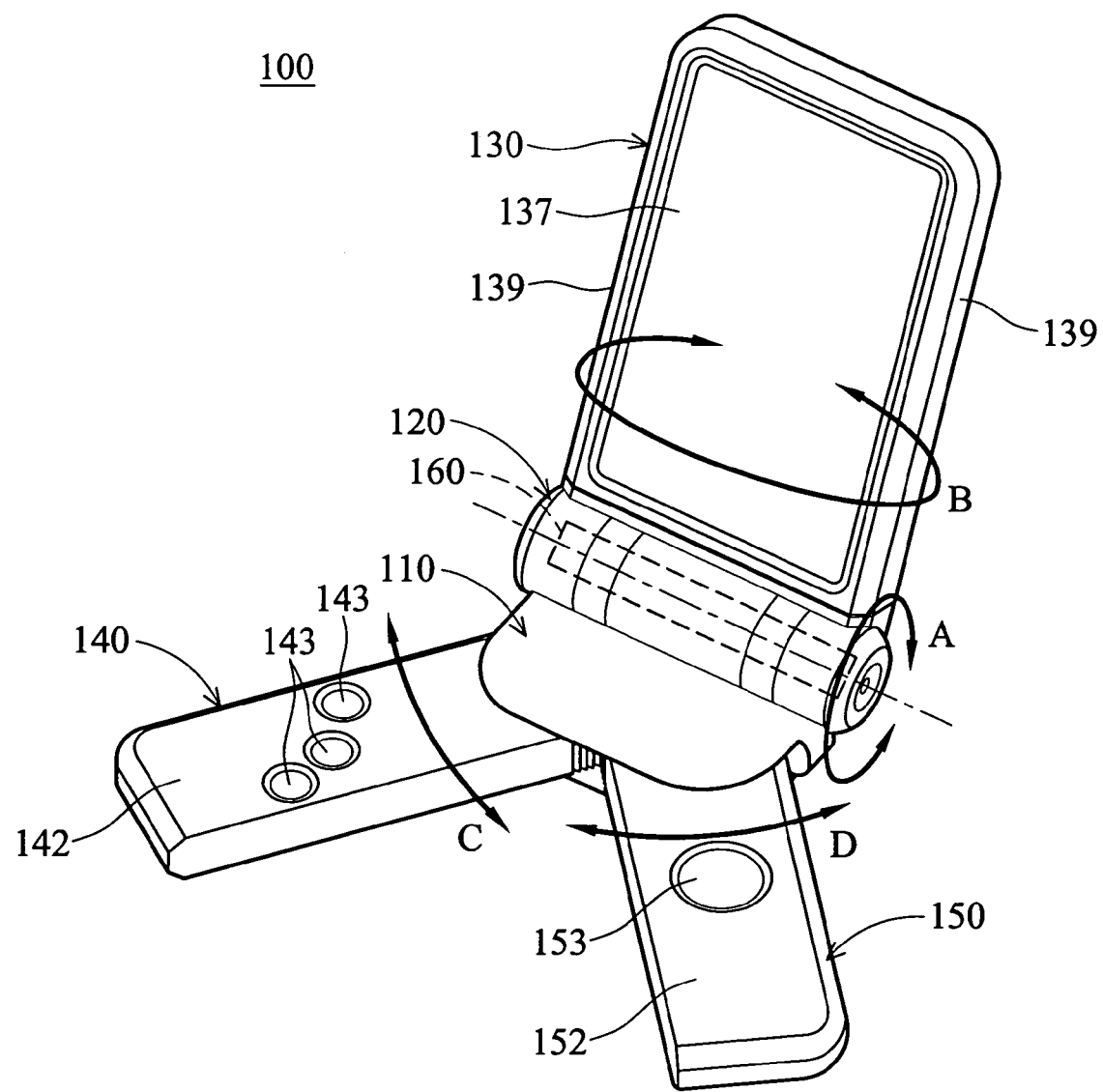
FIG. 1 is a perspective view of the handheld electronic apparatus of the invention.

Referring to FIG. 1, the handheld electronic apparatus 100 comprises a first connecting member 110, a second connecting member 120, an operating member 130, a first holding member 140 and a second holding member 150. The second connecting member 120 is rotatably connected to the first connecting member 110. The operating member 130 is rotatably connected to the second connecting member 120. The first holding member 140 is rotatably connected to the first connecting member 110. The second holding member 150 is rotatably connected to the first connecting member 110. The operating member 130 has two sidewalls 139. The first holding member 140 and second holding member 150 are rotatably connected to or separated from the sidewalls 139.

Figure 2:
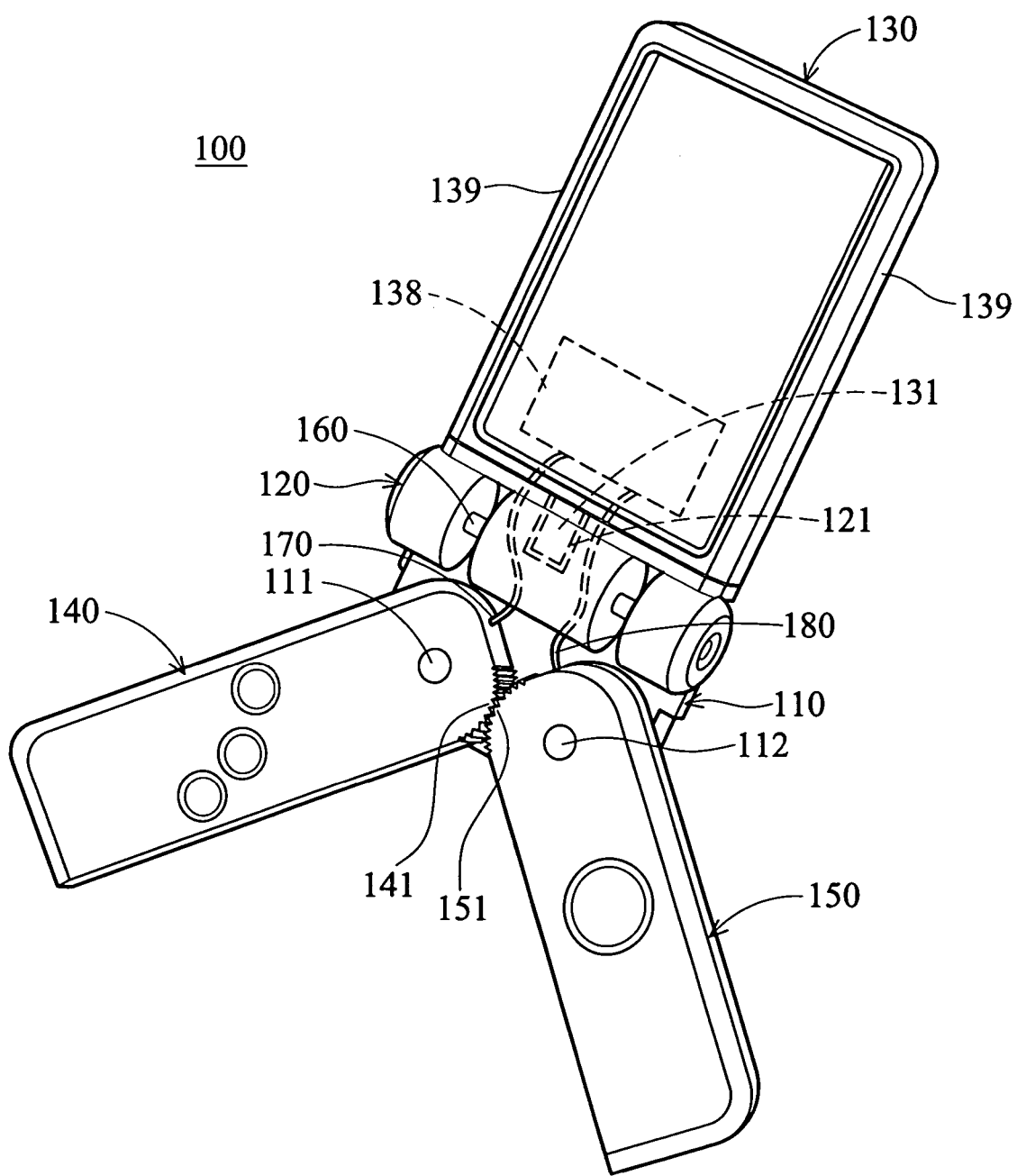
FIG. 2 is a schematic perspective view of the partial inner structure of the handheld electronic apparatus of the invention.

Referring to FIG. 2, a first rotating shaft 160 is disposed between the first connecting member 110 and the second connecting member 120. The first connecting member 110 and second connecting member 120 relatively rotate, as shown by arrow A in FIG. 1, by means of the first rotating shaft 160. Additionally, the second connecting member 120 has a recess 121 and the operating member 130 has a pin (fourth rotating shaft) 131 perpendicular to the first rotating shaft 160. Specifically, the pin (fourth rotating shaft) 131 is rotatably disposed in the recess 121. Thus, the operating member 130 can rotate, as shown by arrow B in FIG. 1, relative to the second connecting member 120.

Figure 3:
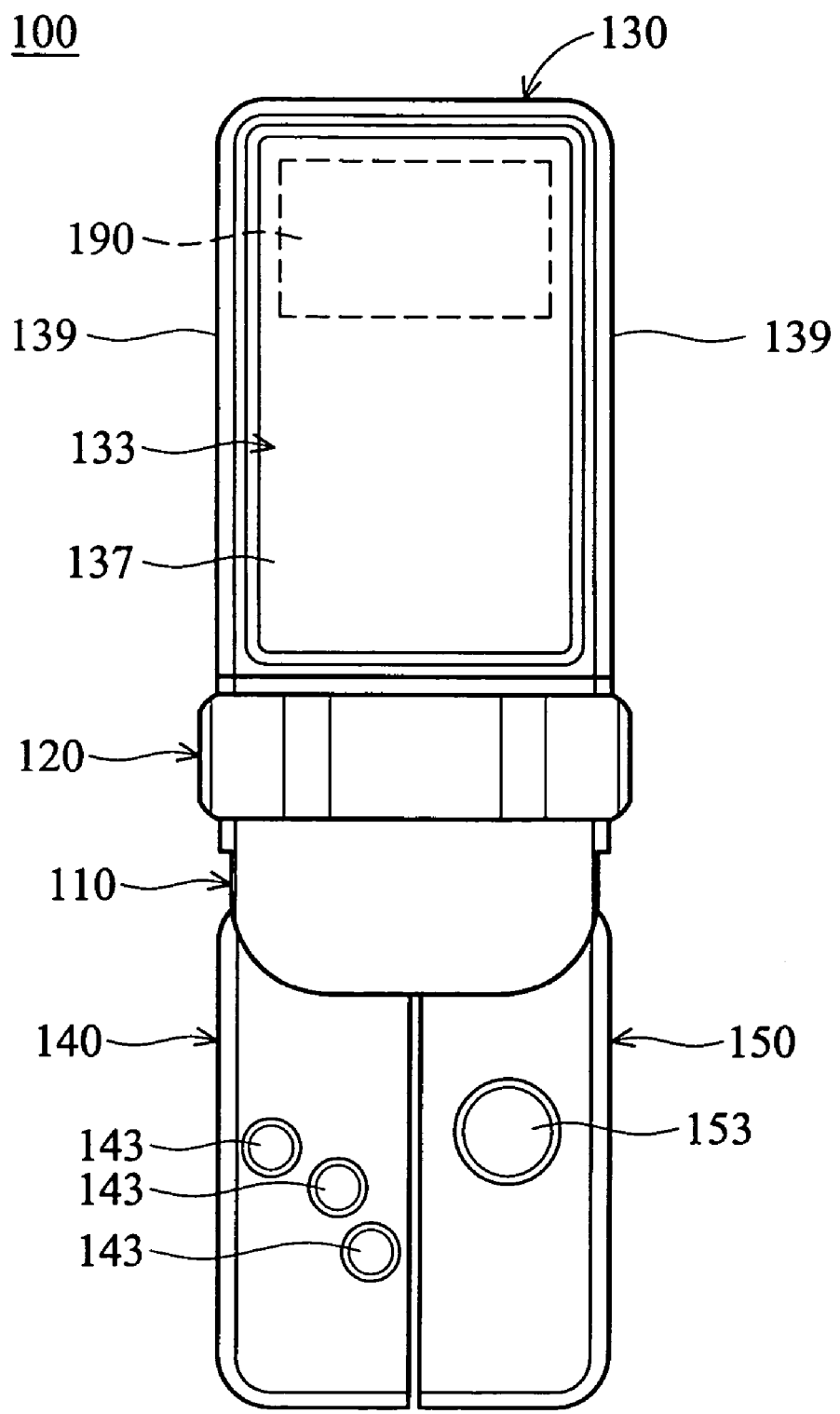
FIG. 3 is a plane view of an operating mode of the handheld electronic apparatus of the invention.
Figure 4:
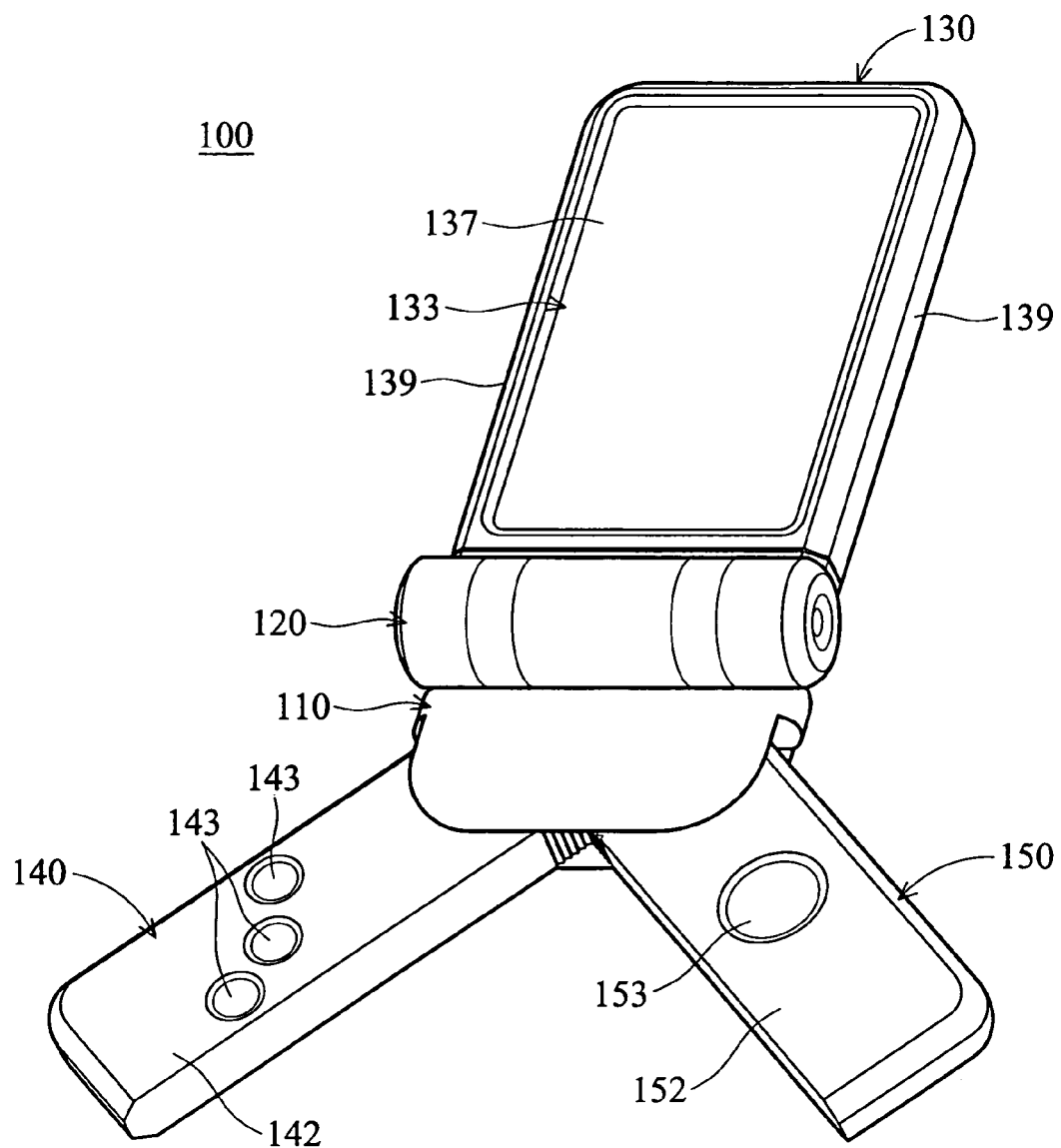
FIG. 4 is a perspective view of another operating mode of the handheld electronic apparatus of the invention.

As shown in FIG. 2, a second rotating shaft 111 and a third rotating shaft 112 are disposed in the first connecting member 110. Specifically, the first holding member 140 is rotatably mounted on the second rotating shaft 111, as shown by arrow C in FIG. 1. The second holding member 150 is rotatably mounted on the third rotating shaft 112, as shown by arrow D in FIG. 1. The first rotating shaft 160, second rotating shaft 111 and pin (fourth rotating shaft) 131 are substantially perpendicular to one another. Additionally, the first holding member 140 has a first toothed portion 141 and the second holding member 150 has a second toothed portion 151 engaging the first toothed portion 141. Thus, the first holding member 140 and second holding member 150 can relatively rotate between a closed position (as shown in FIG. 3) and an open position (as shown in FIG. 4). Moreover, as shown in FIG. 2, a first signal transmission cable 170 connects the first holding member 140 and operating member 130. The first signal transmission cable 170 connects a circuit module 138 of the operating member 130 and first holding member 140 via the first connecting member 110 and second connecting member 120. Similarly, a second signal transmission cable 180 connects the second holding member 150 and operating member 130. The second signal transmission cable 180 connects the circuit module 138 of the operating member 130 and second holding member 150 via the first connecting member 110 and second connecting member 120.

Figure 5:
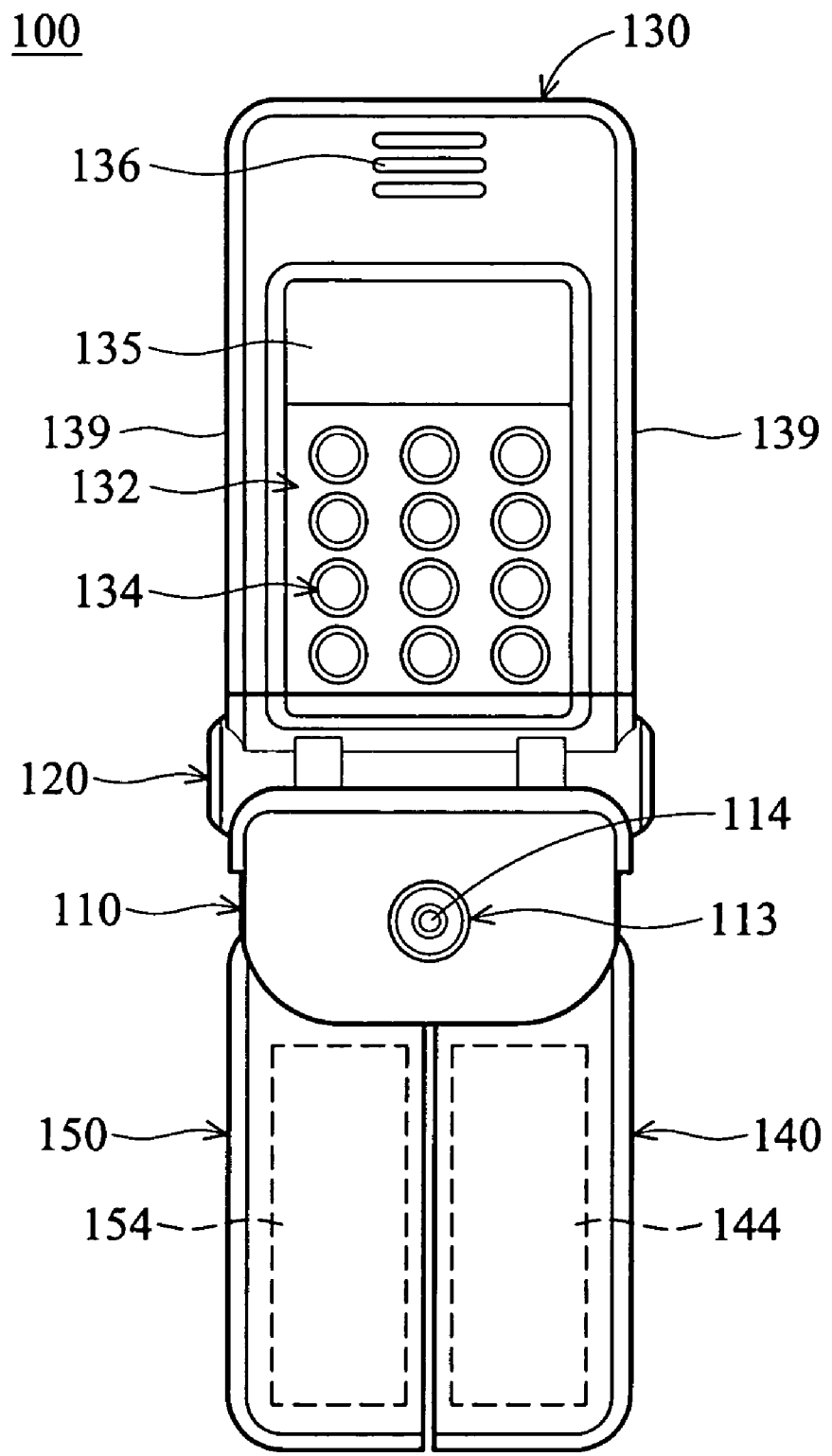
FIG. 5 is a plane view of another operating mode of the handheld electronic apparatus of the invention.

Referring to FIG. 5, an image capturing module 113 is disposed on the first connecting member 110. The image capturing module 113 has a camera lens 114 to enable digital photography. Similarly, the image capturing module 113 is electrically connected to the circuit module 138 of the operating member 130, as shown in FIG. 2.

As shown in FIG. 3 and FIG. 5, a cellular phone module 132 and a computer module 133 are disposed on the operating member 130. Specifically, the cellular phone module 132 and computer module 133 are disposed on opposite surfaces of the operating member 130 and are electrically connected to the circuit module 138 thereof, respectively. Additionally, the cellular phone module 132 has a keypad 134, a display 135 and a speaker 136, and the computer module 133 has an LCD touch panel 137.

Moreover, as shown in FIG. 1 and FIG. 4, the first holding member 140 has a first operating interface 142 and the second holding member 150 has a second operating interface 152. Specifically, three first operating buttons 143 are disposed on the first operating interface 142 and a second operating button 153 is disposed on the second operating interface 152. The first operating buttons 143 and second operating button 153 can simultaneously be used to operate the computer module 133 or play video games displayed on the LCD touch panel 137. Also, the second operating button 153 can serve as a shutter release for the image capturing module 113 (camera lens 114).

In addition, as shown in FIG. 5, two power cell receiving portions 144 and 154 are selectively or respectively disposed in the first holding member 140 and second holding member 150 to receive a cell or cells (not shown) providing power to the circuit module 138 of the operating member 130.

Further, the handheld electronic apparatus 100 has a wireless transmission module 190. The wireless transmission module 190 may be disposed in the operating member 130 (as shown in FIG. 3), first holding member 140, or second holding member 150. The handheld electronic apparatus 100 provides wireless connection with other devices, transmitting and receiving signals by means of the wireless transmission module 190.

The following description is directed to various operating modes of the handheld electronic apparatus 100.

Figure 6:
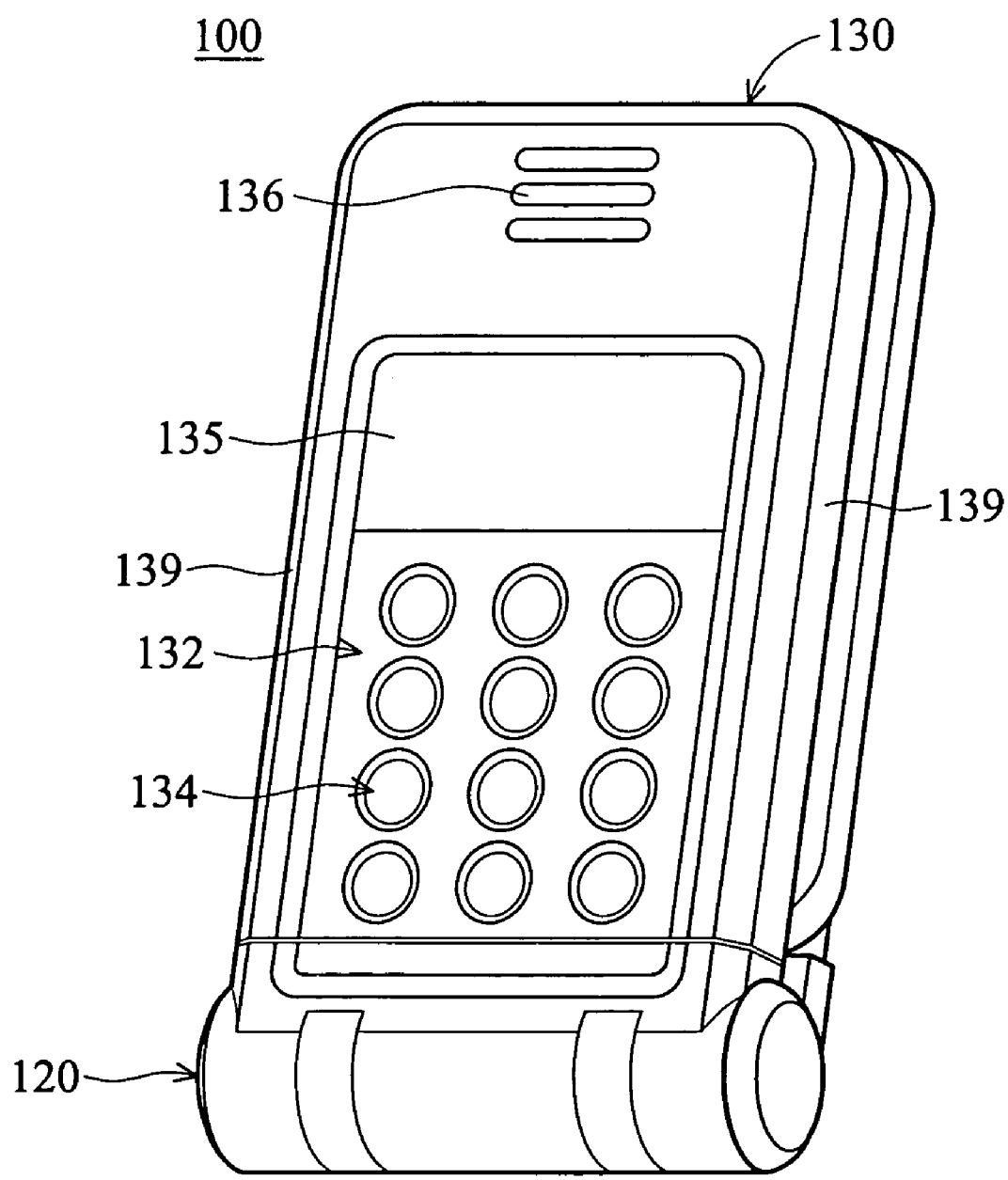
FIG. 6 is a perspective view of another operating mode of the handheld electronic apparatus of the invention.
Figure 10:
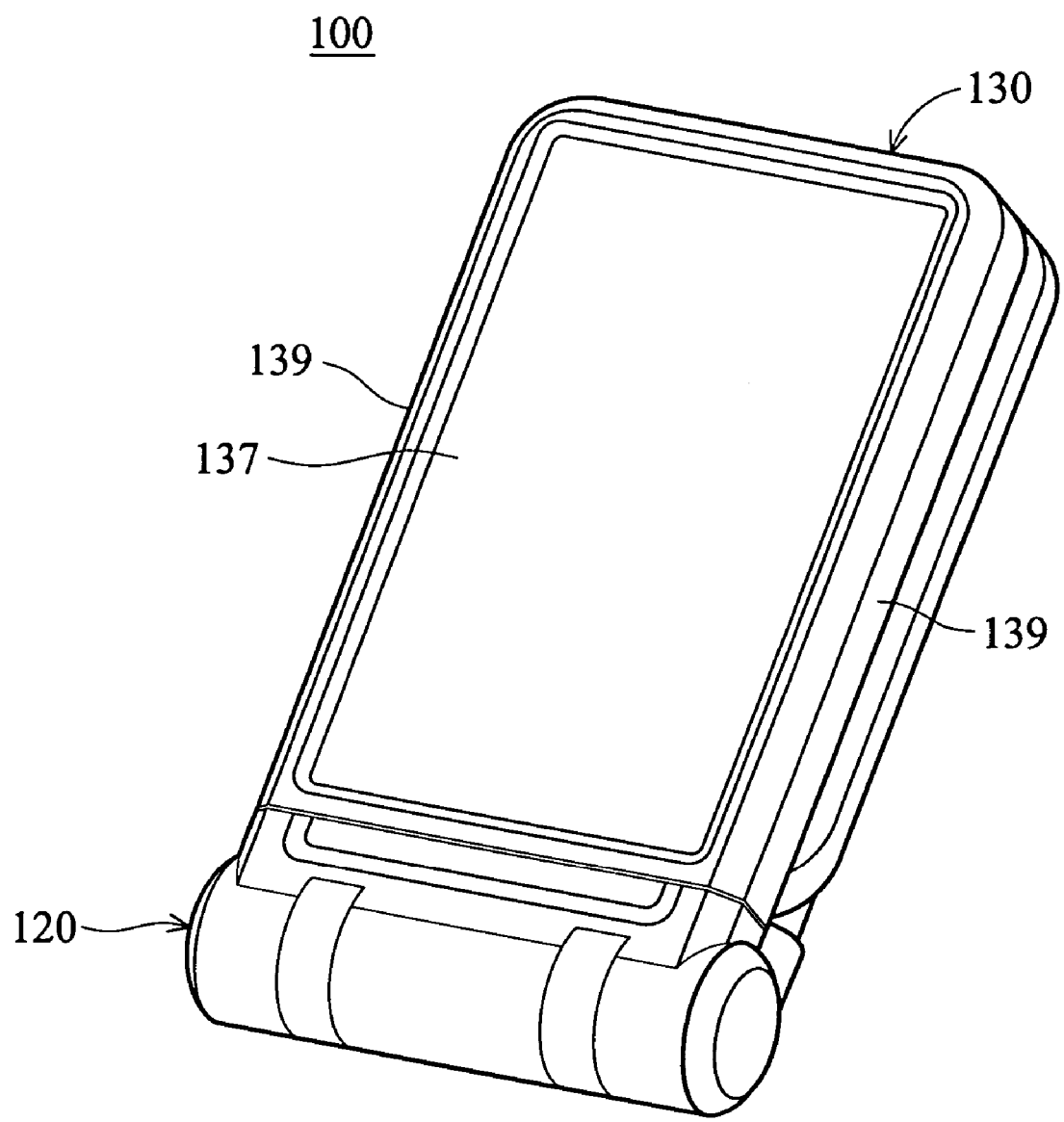
FIG. 10 is a perspective view of another operating mode of the handheld electronic apparatus of the invention according to FIG. 6.

Since the second connecting member 120 can rotate relative to the first connecting member 110 by means of the first rotating shaft 160, the handheld electronic apparatus 100 may collapse into the configuration shown in FIG. 6. At this point, the handheld electronic apparatus 100 can be carried with ease and perform basic communication functions. FIG. 10 shows the back of the handheld electronic apparatus 100 according to FIG. 6. A user can access data from the LCD touch panel 137 of the operating member 130 and input data thereto using conventional stylus/tablet operations. Similarly, the operating member 130 and second connecting member 120 can rotate relative to the first connecting member 110 into the configuration shown in FIG. 5 by means of the first rotating shaft 160. At this point, the cellular phone module 132 of the operating member 130 and image capturing module 113 of the first connecting member 110 are on the same side while the computer module 133 of the operating member 130, first operating interface 142 of the first holding member 140 and second operating interface 152 of the second holding member 150 are on the opposite side, as shown in FIG. 3. The handheld electronic apparatus 100 can then be rotated into the configuration shown in FIG. 4 by relative rotation of the first holding member 140 and second holding member 150. At this point, the user can respectively hold the first holding member 140 and second holding member 150 and operate the first operating buttons 143 and second operating button 153 thereon to play video games.

Figure 7:
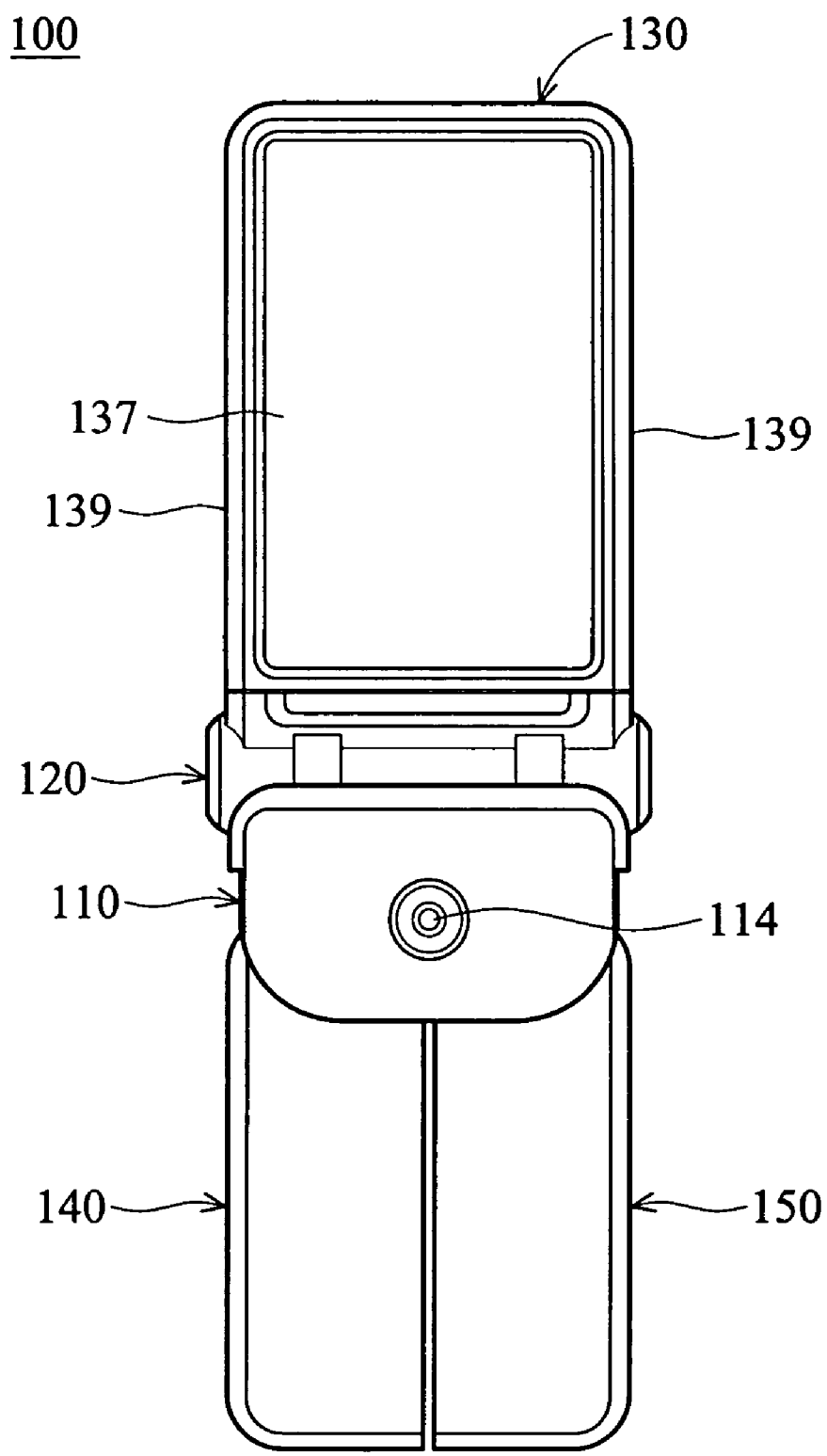
FIG. 7 is a plane view of another operating mode of the handheld electronic apparatus of the invention.

Since the pin (fourth rotating shaft) 131 of the operating member 130 can rotate in the recess 121 of the second connecting member 120, the handheld electronic apparatus 100 can be rotated into the configuration shown in FIG. 7. At this point, the LCD touch panel 137 and camera lens 114 are on the same side, such that the user can perform self-photography and review the captured image on the LCD touch panel 137.

Figure 8:
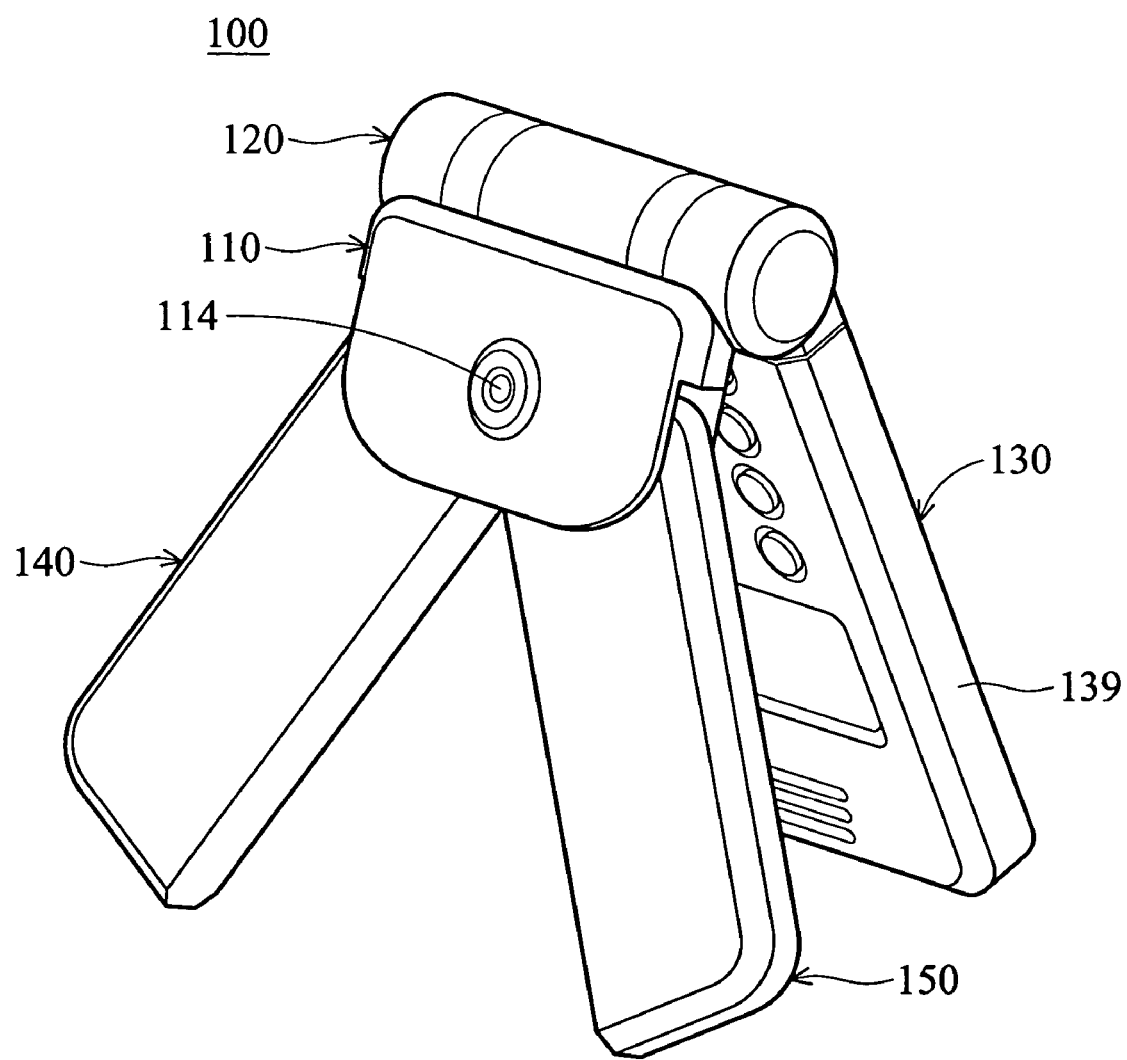
FIG. 8 is a perspective view of another operating mode of the handheld electronic apparatus of the invention.
Figure 9:
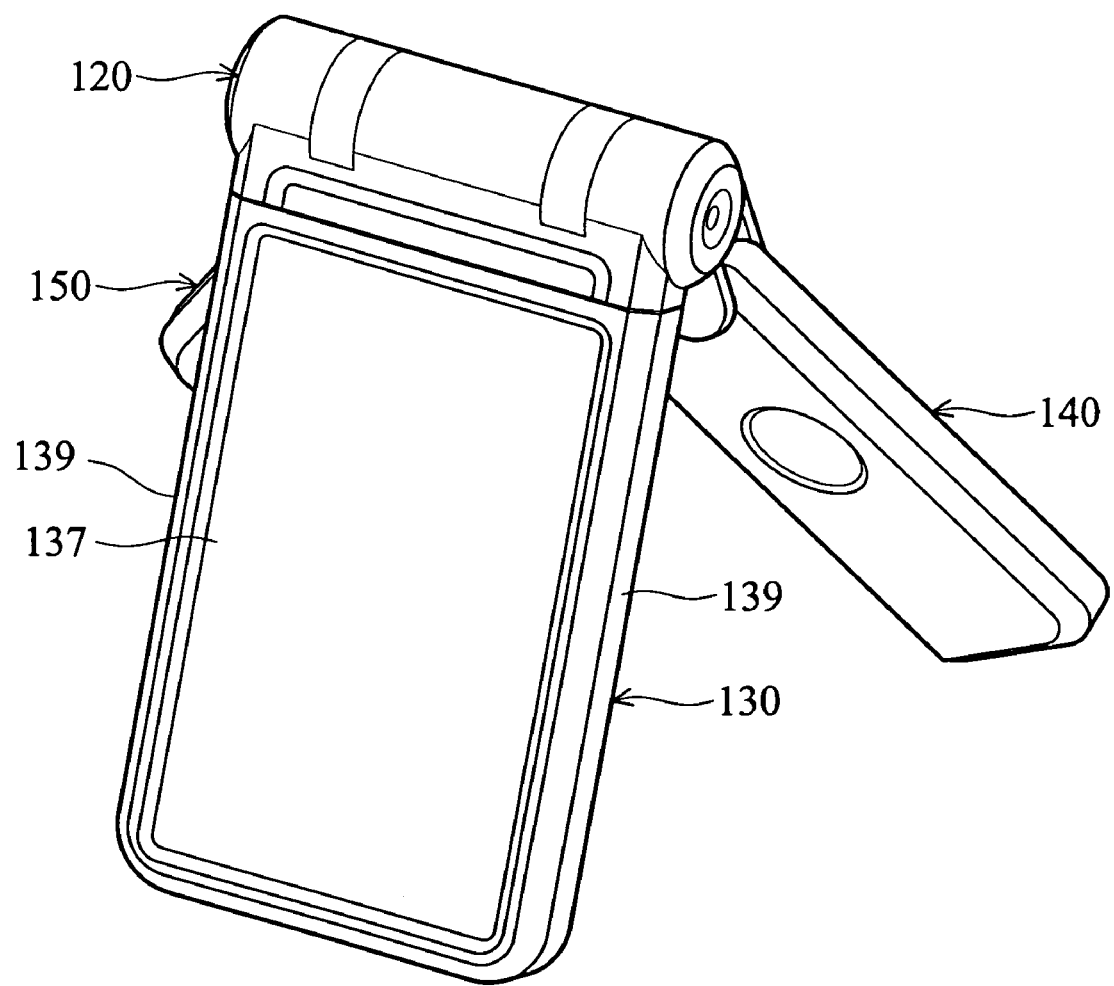
FIG. 9 is a perspective view of another operating mode of the handheld electronic apparatus of the invention according to FIG. 8.

Additionally, when the user does not carry a tripod, the handheld electronic apparatus 100 can further be rotated into the configuration shown in FIG. 8. Herein, the top of the operating member 130 and ends of the first holding member 140 and second holding member 150 simultaneously contact a support surface, providing steady support for improved image capture. Additionally, as shown in FIG. 9, a perspective view of the back of the handheld electronic apparatus 100, since the handheld electronic apparatus 100 is steadily supported, the user can easily access the LCD touch panel 137 of the operating member 130 at the same time.

Figure 11:
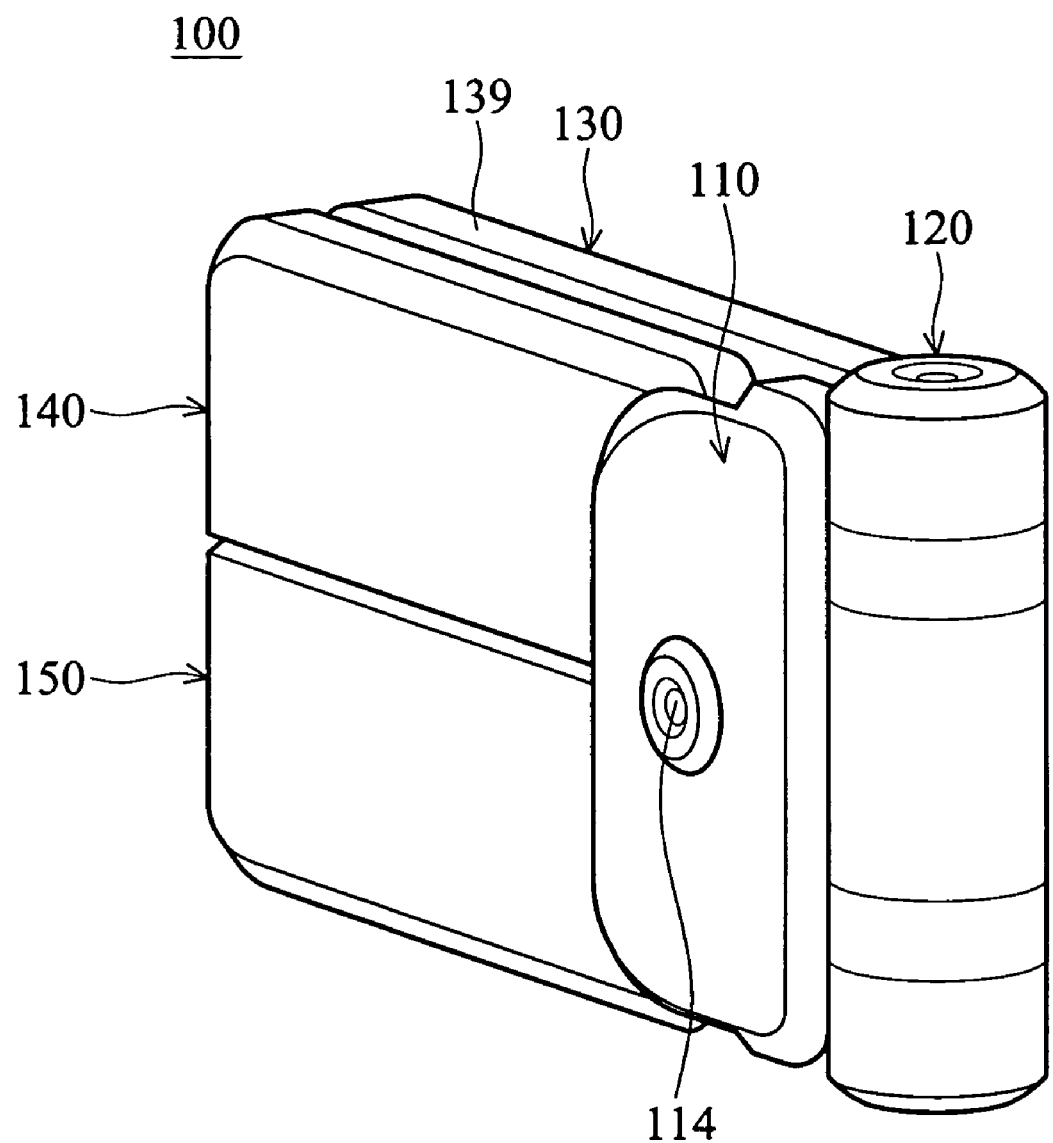
FIG. 11 is a perspective view of another operating mode of the handheld electronic apparatus of the invention.
Figure 12:
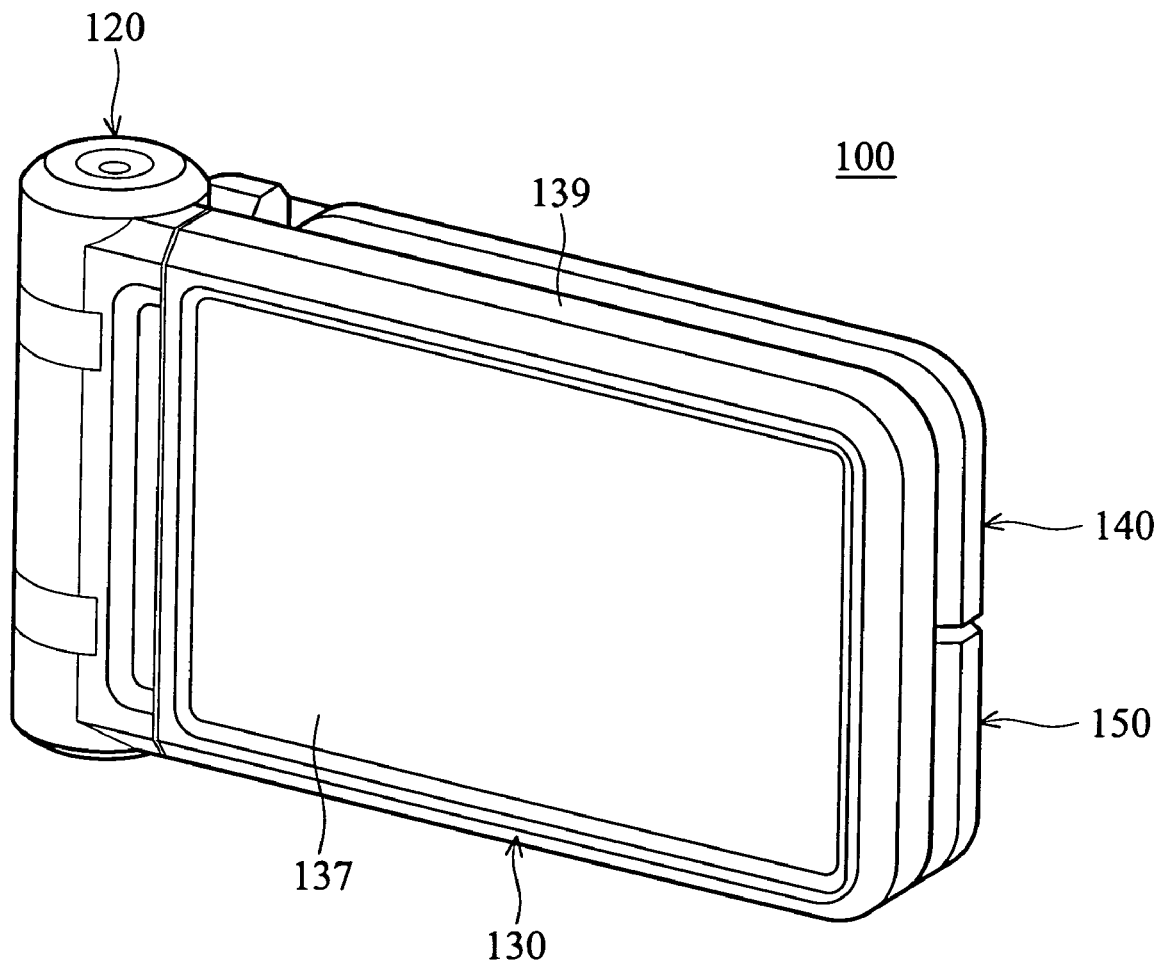
FIG. 12 is a perspective view of another operating mode of the handheld electronic apparatus of the invention according to FIG. 11.

Alternatively, as shown in FIG. 11 and FIG. 12, the user can use the handheld electronic apparatus 100 in the closed configuration shown to, for example, capture and review images.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A handheld electronic apparatus, comprising:
   a first connecting member;
   a second connecting member rotatably connected to the first connecting member;
   an operating member rotatably connected to the second connecting member so that the operating member is capable of rotating relative to the first connecting member;
   a first holding member rotatably connected to the first connecting member;
   a second holding member rotatably connected to the first connecting member, wherein the first and second holding members relatively rotate between a closed position and an open position; and
   a first signal transmission cable connected to the first holding member and operating member, the first signal transmission cable connecting the operating member and first holding member via the first and second connecting members.

2. The handheld electronic apparatus as claimed in claim 1, further comprising a first rotating shaft disposed between the first and second connecting members, the first and second holding members relatively rotating by means of the first rotating shaft.

3. The handheld electronic apparatus as claimed in claim 2, wherein the second connecting member further comprises a recess and the operating member further comprises a pin rotatably disposed therein, whereby the second connecting member and operating member relatively rotate by means of the pin and recess.

4. The handheld electronic apparatus as claimed in claim 3, wherein the first rotating shaft is perpendicular to the pin.

5. The handheld electronic apparatus as claimed in claim 1, further comprising a second rotating shaft and a third rotating shaft, both disposed in the first connecting member, the first holding member rotatably mounted on the second rotating shaft, and the second holding member rotatably mounted on the third rotating shaft.

6. The handheld electronic apparatus as claimed in claim 1, wherein the first holding member further comprises a first toothed portion and the second holding member further comprises a second toothed portion engaging the first toothed portion.

7. The handheld electronic apparatus as claimed in claim 1, wherein the first connecting member further comprises an image capturing module having a camera lens disposed thereon.

8. The handheld electronic apparatus as claimed in claim 1, wherein the operating member further comprises a cellular phone module and a computer module, respectively disposed on opposite surfaces thereof.

9. The handheld electronic apparatus as claimed in claim 8, wherein the cellular phone module further comprises a keypad, a display and a speaker.

10. The handheld electronic apparatus as claimed in claim 8, wherein the computer module further comprises an LCD touch panel.

11. The handheld electronic apparatus as claimed in claim 1, wherein the operating member further comprises a circuit module and the first holding member further comprises a power cell receiving portion to receive a cell providing power to the circuit module.

12. The handheld electronic apparatus as claimed in claim 1, wherein the first holding member further comprises a first operating interface having a first operating button.

13. The handheld electronic apparatus as claimed in claim 1, wherein the second holding member further comprises a second operating interface having a second operating button.

14. The handheld electronic apparatus as claimed in claim 1, further comprising a wireless transmission module disposed in the operating member, first holding member, or second holding member.

15. The handheld electronic apparatus as claimed in claim 1, further comprising a second signal transmission cable connected to the second holding member and operating member, the second signal transmission cable connecting the operating member and second holding member via the first and second connecting members.

16. A handheld electronic apparatus, comprising:
   a first connecting member;
   a second connecting member;
   a first holding member, with a first operating interface;
   an operating member connected to the second connecting member, with a circuit module;
   a first rotating shaft disposed between the first and second connecting members, the operating member and the second connecting member is capable of rotating relative to the first connecting member by means of the first rotating shaft;
   a second rotating shaft disposed between the first connecting member and the first holding member, the first holding member rotating relative to the first connecting member by means of the second rotating shaft; and
   a first signal transmission cable extending in the operating member, first connecting member, second connecting member and first holding member and electrically connected to the first operating interface and circuit module, wherein a first predetermined included angle exists between the first and second rotating shafts such that the operating member moves downward and upward and the first holding member moves leftward and rightward.

17. The handheld electronic apparatus as claimed in claim 16, further comprising a fourth rotating shaft disposed between the second connecting member and the operating member, whereby the operating member rotates relative to the second connecting member by means of the fourth rotating shaft.

18. The handheld electronic apparatus as claimed in claim 17, wherein a second predetermined included angle exists between the fourth and first rotating shafts and a third predetermined included angle exists between the fourth and second rotating shafts, the first, second and third predetermined included angles being 90 degrees, such that the first, second and fourth rotating shafts are substantially perpendicular to one another.

19. The handheld electronic apparatus as claimed in claim 17, further comprising a cellular phone module and a computer module, respectively disposed on opposite surfaces of the operating member, the operating member rotating by means of the fourth rotating shaft such that one of the cellular phone module and computer module and the first operating interface simultaneously face a user.

20. The handheld electronic apparatus as claimed in claim 16, further comprising a second holding member rotatably connected to the first connecting member, whereby the included angle between the first and second holding members changes when the first and second holding members rotate relative to the first connecting member.

21. The handheld electronic apparatus as claimed in claim 20, wherein, when the second connecting member rotates relative to the first connecting member, the top of the operating member and ends of the first and second holding members simultaneously contact a support surface.

22. A handheld electronic apparatus, comprising:
 a first connecting member;
 a second connecting member connected with the first connecting member;
 a first holding member, with a first operating interface;
 an operating member connected to the second connecting member, with a circuit module;
 a second rotating shaft disposed between the first connecting member and the first holding member, the first holding member rotating relative to the first connecting member by means of the second rotating shaft;
 a fourth rotating shaft disposed between the second connecting member and the operating member, whereby the operating member rotates relative to the first connecting member and the second connecting member by means of the fourth rotating shaft; and
 a first signal transmission cable extending in the operating member, first connecting member and first holding member and electrically connected to the first operating interface and circuit module.

23. The handheld electronic apparatus as claimed in claim 22, further comprising a cellular phone module and a computer module, respectively disposed on opposite surfaces of the operating member, the operating member rotating by means of the fourth rotating shaft such that one of the cellular phone module and computer module and the first operating interface simultaneously face a user.

24. The handheld electronic apparatus as claimed in claim 22, further comprising a first rotating shaft disposed between the first and second connecting members, the second connecting member rotating relative to the first connecting member by means of the first rotating shaft, and a first predetermined included angle existing between the first and second rotating shafts such that the operating member moves downward and upward and the first holding member moves leftward and rightward.

25. The handheld electronic apparatus as claimed in claim 24, further comprising a second holding member rotatably connected to the first connecting member, whereby the included angle between the first and second holding members changes when the first and second holding members rotate relative to the first connecting member.

26. The handheld electronic apparatus as claimed in claim 25, wherein, when the second connecting member rotates relative to the first connecting member, the top of the operating member and ends of the first and second holding members simultaneously contact a support surface.

* * * * *